K. GODDARD.
SECURING NUTS TO AXLES.
No. 14,953. Patented May 27, 1856.
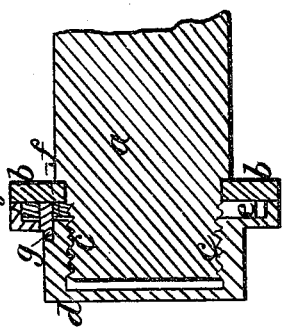
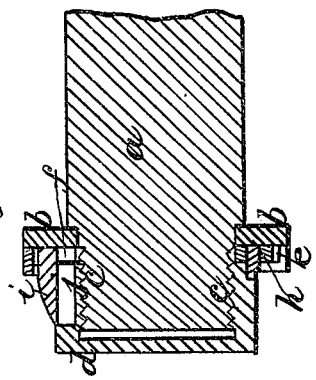
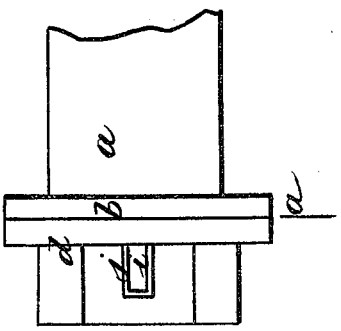
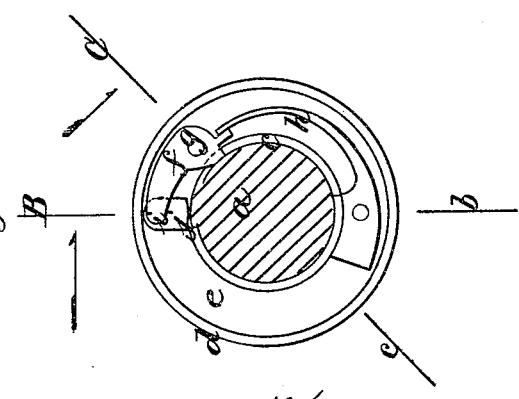
Witnesses
Inventor;

UNITED STATES PATENT OFFICE.

KINGSTON GODDARD, OF PHILADELPHIA, PENNSYLVANIA.

SECURING NUTS TO CARRIAGE-AXLES.

Specification of Letters Patent No. 14,953, dated May 27, 1856.

*To all whom it may concern:*

Be it known that I, KINGSTON GODDARD, of Philadelphia, in the State of Pennsylvania, have invented a new and useful Improvement in the Method of Securing Nuts on the Ends of Axles, of which the following is a full, clear, and exact description, reference being had to the accompanying drawings, making part of this specification, in which—

Figure 1, is an elevation. Fig. 2, a cross section taken at the line A, $a$, of Fig. 1; and Figs. 3, and 4, longitudinal sections taken at the lines B, $b$, and C, $c$, of Fig. 2.

The same letters indicate like parts in all the figures.

The object of my invention is to make a screw nut which when screwed up on the end of the axle tree of a carriage to hold the carriage hub on the axle, or to hold any other rotating body on an axle, will not be liable to be unscrewed either by the turning of such hub, or other body, or by concussions, jars or vibrations; and which at the same time will admit of being readily screwed up or unscrewed by a wrench without any other operations than that of putting on the wrench and turning it. And my said invention consists in combining with the nut a spring friction brake which by the tension of the spring shall make friction on the thread of the screw to prevent the nut from turning, the said friction brake being made to pass through and project outside of the face of the nut, so that in putting the wrench on the nut the friction brake shall be withdrawn from the surface of the thread to relieve the friction and permit the nut to turn freely.

In the accompanying drawings $a$, represents one end of a carriage or other axle with a shoulder against which a washer $b$, bears, a screw thread $c$, being cut or otherwise formed on the axle beyond the shoulder to receive the nut $d$, tapped in the usual way. The inner face of this nut is cut out as at $e$, to form a recess in which is placed a friction brake $f$, that turns on a fulcrum pin $g$. The under face of this brake is eccentric and made to fit the threads of the screw or simply to bear on the outer portion of the threads, by the tension of a spring $h$, one end of which is attached to the nut in the recess $e$, and the other bearing on the brake to force its eccentric face against the threads of the screw. The outer arm $i$, of the brake is bent at right angles and passes through a hole $j$, to the outside of the nut so as to work in the said hole, and project with a bevel or inclined face beyond one of the outer faces of the nut when the eccentric face of the said brake is in contact with the thread of the screw, and this projection must be such that when forced in by slipping the wrench onto the nut the eccentric face shall be relieved from the thread of the screw that the nut may turn freely. In this way it will be seen that so long as the brake is made to bear on the thread of the screw by the tension of the spring the nut cannot turn without overcoming the bite of the brake, and that by reason of the eccentric form of the face of the brake every attempt to turn back the nut increases the bite and friction consequent thereon, so that the nut can not be turned back either by the turning of the wheel or other body on the axle, or by jars, concussions or vibrations, and hence there will be no necessity for the use of any linch pin, catch, or any of the uncertain devices heretofore employed for this purpose.

I do not wish to be understood as limiting my claim of invention to the special form or arrangement of brake and spring as these may be modified within the range of my invention.

What I claim as my invention and desire to secure by Letters Patent is—

The method of securing screw nuts on axles by combining with the nut in the manner substantially as herein specified a spring friction brake to act on the thread of the screw by the tension of the spring substantially as described, the lever or arm of the said brake being made to extend beyond one of the faces of the nut substantially as described that the brake may be withdrawn from the thread of the screw by the act of putting on the screw wrench to take off or put on the nut, as set forth.

KINGSTON GODDARD.

Witnesses:
JOHN THOMPSON,
FRANCIS JANNEY.